United States Patent [19]
Penfield et al.

[11] Patent Number: 6,058,173
[45] Date of Patent: May 2, 2000

[54] REAL-TIME CALL RATING AND DEBITING SYSTEM

[75] Inventors: Robert F. Penfield, Maynard; Patrick J. MeLampy, Pepperell, both of Mass.

[73] Assignee: LHS Group Inc., Atlanta, Ga.

[21] Appl. No.: 09/025,877

[22] Filed: Feb. 19, 1998

[51] Int. Cl.[7] .................................................. H04M 17/00
[52] U.S. Cl. ......................... 379/144; 379/111; 379/112; 379/114
[58] Field of Search ................................... 379/144, 114, 379/67.1, 111, 112

[56] References Cited

U.S. PATENT DOCUMENTS

| | | | |
|---|---|---|---|
| 4,439,636 | 3/1984 | Newkirk et aL. | 179/7.1 |
| 4,518,824 | 5/1985 | Mondardini | 179/6.3 |
| 4,706,275 | 11/1987 | Kamil | 379/144 |
| 4,897,870 | 1/1990 | Golden | 379/144 |
| 4,975,942 | 12/1990 | Zebryk | 379/144 |
| 5,155,342 | 10/1992 | Urano | 235/380 |
| 5,163,086 | 11/1992 | Ahearn et al. | 379/91 |
| 5,226,073 | 7/1993 | Albal et al. | 379/91 |
| 5,353,335 | 10/1994 | D'Urso et al. | 379/67 |
| 5,359,642 | 10/1994 | Castro | 379/121 |
| 5,408,519 | 4/1995 | Pierce et al. | 379/67 |
| 5,563,934 | 10/1996 | Eda | 379/144 |
| 5,570,416 | 10/1996 | Kroll | 379/114 |
| 5,577,109 | 11/1996 | Stimson et al. | 379/112 |
| 5,621,787 | 4/1997 | McKoy et al. | 379/144 |
| 5,677,945 | 10/1997 | Mullins et al. | 379/91 |
| 5,721,768 | 2/1998 | Stimson et al. | 379/114 |
| 5,991,380 | 11/1999 | Bruno et al. | 379/115 |

*Primary Examiner*—Curtis A. Kuntz
*Assistant Examiner*—Quoc Tran
*Attorney, Agent, or Firm*—Thomas, Kayden, Horstemeyer & Risley LLP

[57] ABSTRACT

A software process setting time limits for telephone calls so that a subscriber's account balance is not exceeded. The method estimates the time when the subscriber's balance will expire by using total charges for all calls per second. The process accounts for time already paid for, reserving the minimum continuation time for adding a new call, reserving time for all calls up to the latest paid for time, dividing the remaining balance by total charges per second to estimate the time left before the subscriber's balance reaches zero, an setting the time limit for each call accordingly.

16 Claims, 5 Drawing Sheets

REAL-TIME CALL RATING AND DEBITING SYSTEM

CROSS-REFERENCE TO RELATED APPLICATIONS

The invention disclosed in this application is related to and compatible with the telephone call completion hardware system disclosed and claimed in co-pending, commonly-owned U.S. application Ser. No. 08/960,860 (attorney docket no. 17471.00406), which is incorporated herein by reference.

FIELD OF THE INVENTION

The present invention relates generally to the field of credit/debit card telephone call rating and billing (or debiting of an established account balance) and more specifically to a process for real-time call rating and debiting for a given subscriber to ensure that the charges incurred do not exceed the available balance in the subscriber's account.

BACKGROUND OF THE INVENTION

In conventional credit/debit card and calling card applications there are only two calls involved. These are the inbound calls from the caller/subscriber into the service provider's platform, and the outbound call to the destination number. Computing the time remaining, based upon the available balance in the subscriber's account, is straightforward for the two call scenario even if both legs are being charged. However, modern calling systems can be much more complex. By way of example, there can be applications involving one number with multiple simultaneous inbound calls, multiple "follow-me" calls, or conferencing. Moreover, there can be more than two calls in progress at the same time.

Therefore, there is a need for a system of rating and debiting complex debit card calls. Also, there is a need for a system that coordinates call rating and debiting functions for all calls for a given subscriber to ensure that the charges incurred do not exceed the available balance in the subscriber's account. And finally, there is a need for these capabilities in real time.

SUMMARY OF THE INVENTION

The present invention comprises a real-time call rating and debiting system. A preferred embodiment of the invention comprises a software process setting time limits for telephone calls so that a subscriber's account balance is not exceeded. The method estimates the time when the subscriber's balance will expire using total charges for all calls per a given time period. The process accounts for time already paid for, reserving the minimum continuation time for adding a new call, reserving time for all calls up to the latest paid-for time, dividing the remaining balance by total charges per a given time period to estimate the time left before the subscriber's balance reaches zero, and setting the time limit for each call accordingly.

It is therefore a principal advantage of the present invention to provide a real-time call rating and debiting process for all calls for a given telephone system subscriber to ensure that the charges incurred do not exceed the available balance in the subscriber's account.

It is another advantage of the invention to provide a method for rating and billing complex debit card telephone calls such as one number with simultaneous inbound calls, multiple "follow-me" calls and conference calls.

It is still another advantage of the invention to provide a method for setting time limits for a subscriber's calls by estimating the time when the subscriber's account balance runs out by using total charges for all calls per a given time period, accounting for time already paid for calls in progress, reserving a minimum time for all calls, reserving time for all calls in progress up to the latest paid/reserved time, reserving minimum call continuation time for calls in progress, and dividing the remaining balance by the total charges per second to estimate the time the subscriber's balance runs out.

BRIEF DESCRIPTION OF THE DRAWINGS

The aforementioned advantages of the present invention, as well as additional advantages thereof, will be more fully understood hereinafter as a result of a detailed description of a preferred embodiment when taken in conjunction with the following drawings in which.

DETAILED DESCRIPTION OF A PREFERRED EMBODIMENT

As used herein, the following terms have these respective preferred definitions:

Elapsed Time The total time of the call from when the call arrives at the system to when the line is hung up. For outbound calls, the start time for measuring elapsed time is when dialing of the destination number is complete.

Talk Time The total time charged to the call. This will differ from the elapsed time when time is charged starting from when the call is answered (as opposed to call arrival or dialing complete) and when rating options cause charging of a call to be suspended during the call.

Billing Period The unit of time that a call rate applies to. Calls are charged for the number of billing periods the call lasts. A basic Call Rate defines the charge for a given period of time (billing period). The call is charged the rate times the integral number of billing periods used. A whole billing period is charged for any partial billing period used. For example, if the call rate is $1 per minute and the call has a talk time of 2 minutes and 15 seconds, the call is charged $3 for 3 billing periods.

Initial Period & Rate An initial period with an initial rate or charge is used affect a minimum charge for a call. For example, with a rate of $0.10 per 6 seconds, and initial period of 30 seconds with an initial rate of $0.50, a call with less than 25 seconds of talk time will be charged $0.50.

Origin The calling party telephone number where a call originates.

Destination The called party telephone number where a call terminates.

Minimum Continuation Time This is the minimum amount of time that a call already in progress must be allowed to continue. It is used to "reserve" time for the call so that new calls will not be allowed unless the required time can be reserved.

Call Rating Options

Turning first to call rating options, call rates are defined using an origin and a destination (from and to numbers), initial period, initial rate, subsequent billing period and rate. Inbound and outbound rates are defined in separate rate tables. Additional options for call rating include rate by time of day, day of week and holidal Also, calls can be charged from the call arrival for inbound, dialing complete for outbound, or from when the call is answered (inbound or outbound).

More complex rating methods, such as variable rating, could be employed, however, a preferred implementation of the inventive system uses an initial period and rate and a subsequent billing period and rate.

Rating Scenarios

Figure 1:
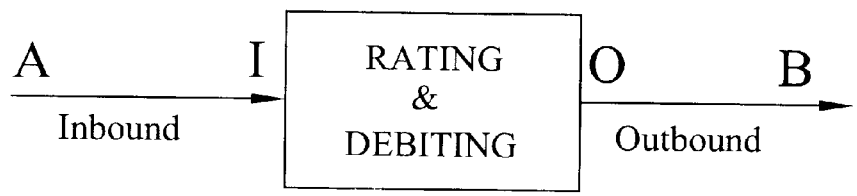
FIG. 1 is a simplified diagram of an application of the present invention to a simple inbound and outbound call scenario.

For inbound calls, the origin (A in FIG. 1) is the calling party number supplied by the telephone network (when available). The destination for inbound calls (I in FIG. 1) is either a) the called party number supplied by the network or b) the telephone number defined in the system for the incoming line (this option is configurable by the rating table).

For outbound calls, the origin varies depending on the type of calls. The destination is the number called by the system (B in FIGS. 1 and 2). For "tandem" calls which are routed through the system using the inbound calling and called party, the origin is the origin of the inbound call (A in FIG. 1). For outbound calls generated for other calls (e.g. follow me out dial for an inbound call), the origin is the telephone number defined in system for the incoming line (I in FIGS. 1 and 2, and $O_b$ in FIG. 3). When there is not an inbound call associated with an outbound call, the telephone number defined in the system for the outgoing line is used for the origin (O in FIG. 1).

Figure 2:
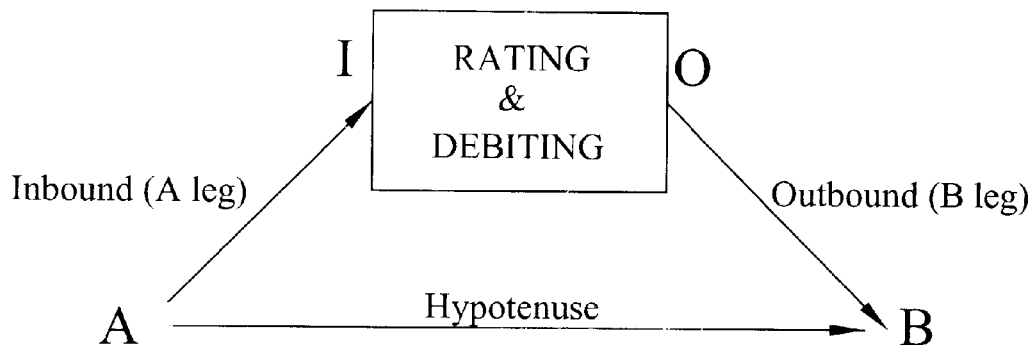
FIG. 2 is a simplified diagram of an application of the invention to a tandem call through the invention where the inbound call is routed to the destination.

A hypotenuse rate is used to cover both inbound and outbound legs (or two outbound legs) with a single rate. FIG. 2 illustrates a tandem call through the system where the inbound call is routed to the destination.

Figure 3:
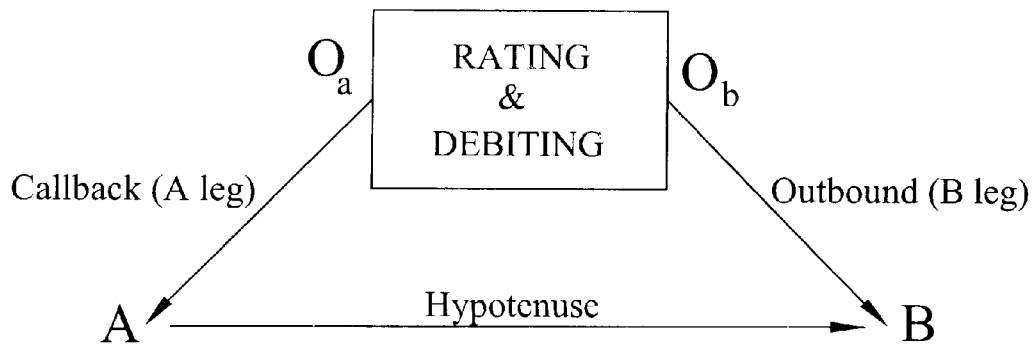
FIG. 3 is a simplified diagram of an application of the invention to a two outbound call scenario.

FIG. 3 illustrates a callback outdial to subscriber to allow them to place an outbound call. For "hypotenuse" rating, the origin is the far end number of the A leg (inbound origin A in FIGS. 2 and callback destination A in FIG. 3). The hypotenuse rate (A to B in FIGS. 2 and 3) is applied to the B leg of the call. For the period of time that the two calls are connected, no talk time is charged to the A leg.

Multiple Call Rating

For situations where one subscriber has more than two calls in progress at the same time, the time limit for the calls is calculated based on when the subscriber's available balance will be used up. Since calls are charged by whole billing periods, each call's time limit must be at the end of a billing period. Therefore, the time limit of one call will not necessarily be the same as another call for the subscriber. The method used by the present invention to set the time limits for the calls estimates the time when the subscriber balance runs out using the total charges for all calls per second. After accounting for any time already paid for, reserving the minimum continuation time in the case of adding a new call, and reserving time for all calls up to the latest paid/reserved time, the remaining balance is divided by the total charges per second to estimate the time the subscriber's balance runs out. The time limit for each call will be the end of the latest billing period equal to or earlier than the estimated time limit. This guarantees that the calls will be terminated before the subscriber's balance is exceeded.

Flow Charts

The flow charts of FIGS. 4 to 7 describe the preferred method of processing for call rating and debiting performed by the inventive system.

compute_call

The compute_call procedure is performed at the following various points during the call to compute the charges for the call and establish the call time limit based on the money available in the subscriber's account and the other calls in progress for that subscriber.

Inbound call arrival

Outbound call request

Outbound call outseizure

Inbound/Outbound call answered

Connection of one call to another call

Connection of call to conference

Connection of call to internal resource (e.g. voice, fax, speech recognition, etc.)

Invocation of a service (e.g. place call, leave message, etc.)

Figure 4:
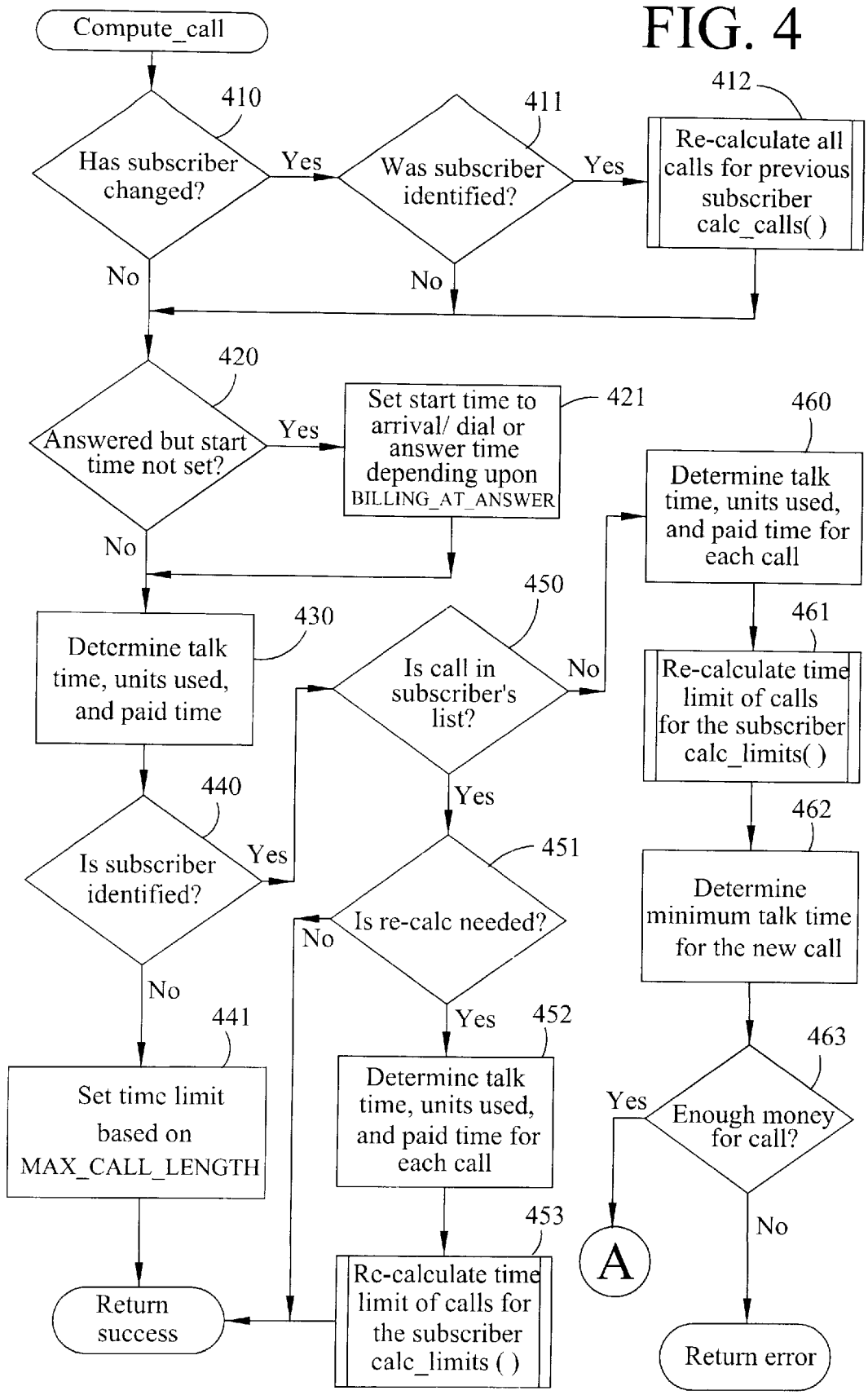
FIG. 4 is a flow chart diagram of an initial part of a compute_call program.
Figure 5:
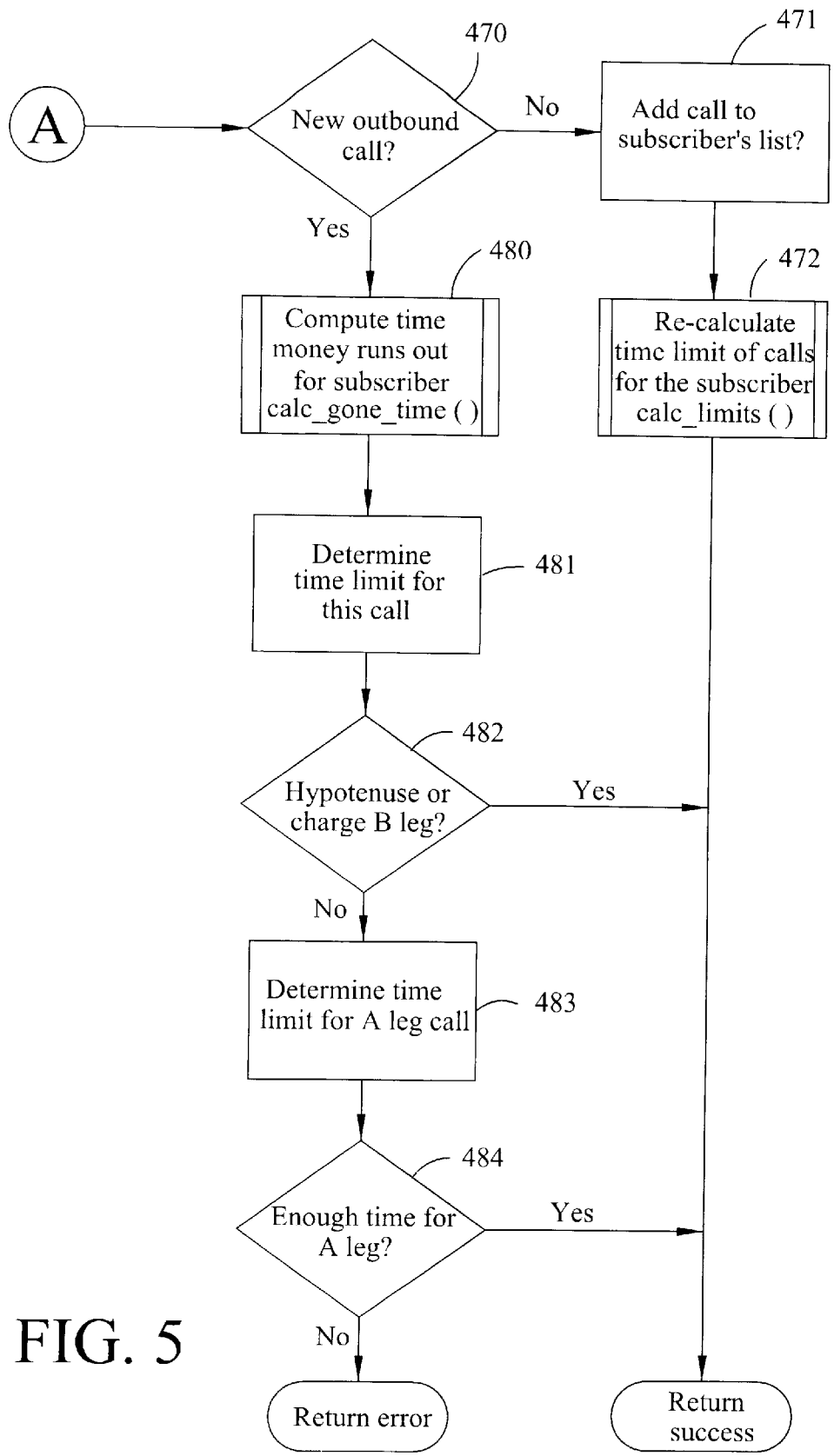
FIG. 5 is a flow chart diagram of the remaining part of the compute_call program.

The process comprises the following steps shown in FIGS. 4 and 5.

At step 410, the system tests whether the call is still being billed to the same subscriber. The yes branch is taken if the subscriber has changed from the last execution of the compute_call procedure or this is the first execution of computer_call. At step 411, the system then tests whether the billed subscriber was defined the last time compute_call was executed. The no branch is taken if this is the first execution of computer_call.

At step 412, the call is removed from the previous subscriber's list, and all the calls for that subscriber must be recalculated. Each call for the subscriber is recalculated as follows: Except when the call is the A Leg of a connection with hypotenuse rating or charging B Leg, the difference between the current time and the last computation of the call is added to the talk time for the call. The units used are calculated from the total talk time. The paid time for the call is the end of the current billing period. The system then executes the calc_limits procedure to determine the time limits for the previous subscriber's remaining calls. At step 420, the system takes the yes branch if the call has been answered, but the start time has not been set. As step 421, if BILLING_AT_ANSWER is on, the start time for the call is set to the time that the call was answered. Otherwise, it is set to the arrival time for inbound calls, and the dialing completed time for outbound calls.

At step 430, except when this call is the A Leg of a connection with hypotenuse rating or charging B Leg, the difference between the current time and the last computation of the call is added to the talk time for the call. The units used is calculated from the total talk time. The paid time for the call is the end of the current billing period.

At step 440, if the subscriber that the call is being billed to is identified, additional processing for this call and the subscriber's other calls may be required. At step 441, when the call is not being charged to a subscriber, the timer limit for the call is set based on the MAX_CALL_LENGTH (maximum duration of a call).

At step 450, if this call is not already in the subscriber's list of calls, the system needs to determine if there is enough money to add this call. At step 451, all calls for the subscriber must be recalculated when a) a call is answered, b) the subscriber for the call changes, or c) the charging status of the call changes (transition to or from Leg A of hypotenuse or charge B leg). At step 452, each call for the subscriber is recalculated as described in step 430. At step 453, the system executes the calc_limits procedure to determine the time limits for the subscriber's remaining calls.

At step 460, each call already in the subscriber's list for the subscriber is recalculated as described in step 430. At step 461, the system executes the calc_limits procedure to determine the time limits for the subscriber's calls. At step 462, the system determines the minimum talk time for the call. For outbound calls, when billing from dialing complete, this will include the "wait for answer" time. At step 463, the system determines whether there is enough money for the call, and if not, the call is rejected.

At step 470, for a new outbound call that has not yet been outdialed, special processing is required (steps 480 thru 484). At step 471, the system adds the new call to the subscriber's list of calls. At step 472, the system executes the calc_limits procedure to determine the time limits for the previous subscriber's remaining calls.

At step 480, the system executes the calc_gone_time procedure to determine the time when the subscriber's money will run out. At step 481, the system determines the time limit for the new call using the calculated "gone" time. At step 482, if the new call is the B leg of a hypotenuse or charge B leg call, processing is complete. At step 483, the system determines the time limit for the A leg of the call using the "gone" time (latest billing period) which ends at or before the "gone" time. At step 484, the time remaining for the A leg must be enough for the B leg to last its minimum call length. If the A leg cannot last long enough, the outdial cannot be placed.

calc_limits

Figure 6:
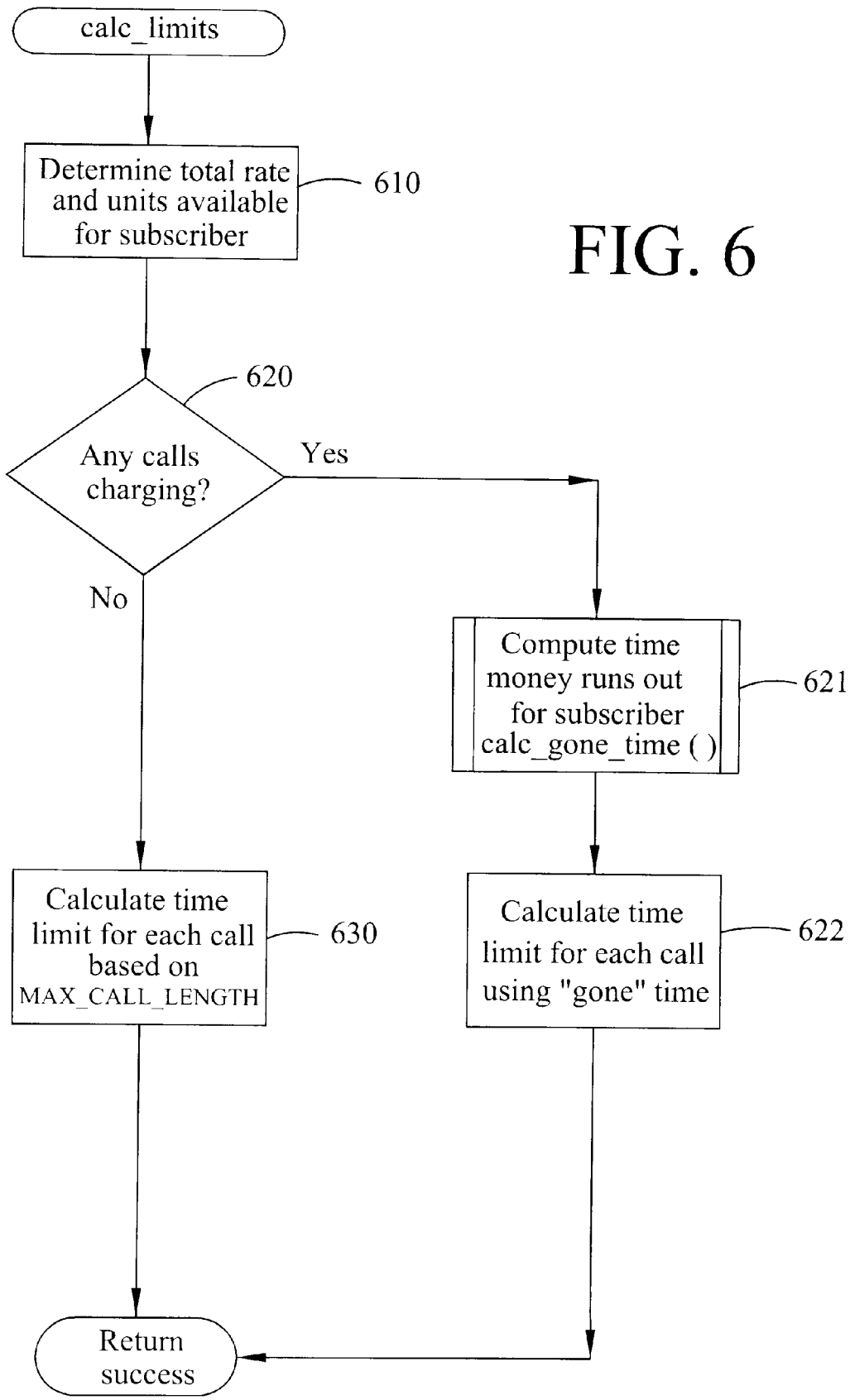
FIG. 6 is a flow chart diagram of a calc_limits program.

Referring next to FIG. 6, the calc_limits procedure calculates the time limit for all of the subscriber's calls. Referring first to step 610, the total units available for the subscriber is equal to the subscriber's balance less the total of units used by all the call in progress, less the units reserved for pending outdials.

At step 620, the system determines whether any of the subscriber's calls are charging. If so, the time limit must be set such that the subscriber's available balance is not exceeded if all calls continue to their limit. At step 421, the system executes the calc_gone_time procedure to determine when the subscriber's available balance will run out. At step 622, the system calculate the time limit for each call based on the "gone" time computed by calc_gone_time. For each call, the time limit is set to the end of last billing period which ends at or before the "gone" time. For calls that are not charging, the limit is set based on the MAX_CALL_LENGTH parameter. At step 630, when no calls are charging, each call's time limit is set based on the MAX_CALL_LENGTH parameter.

calc_gone_time

Figure 7:
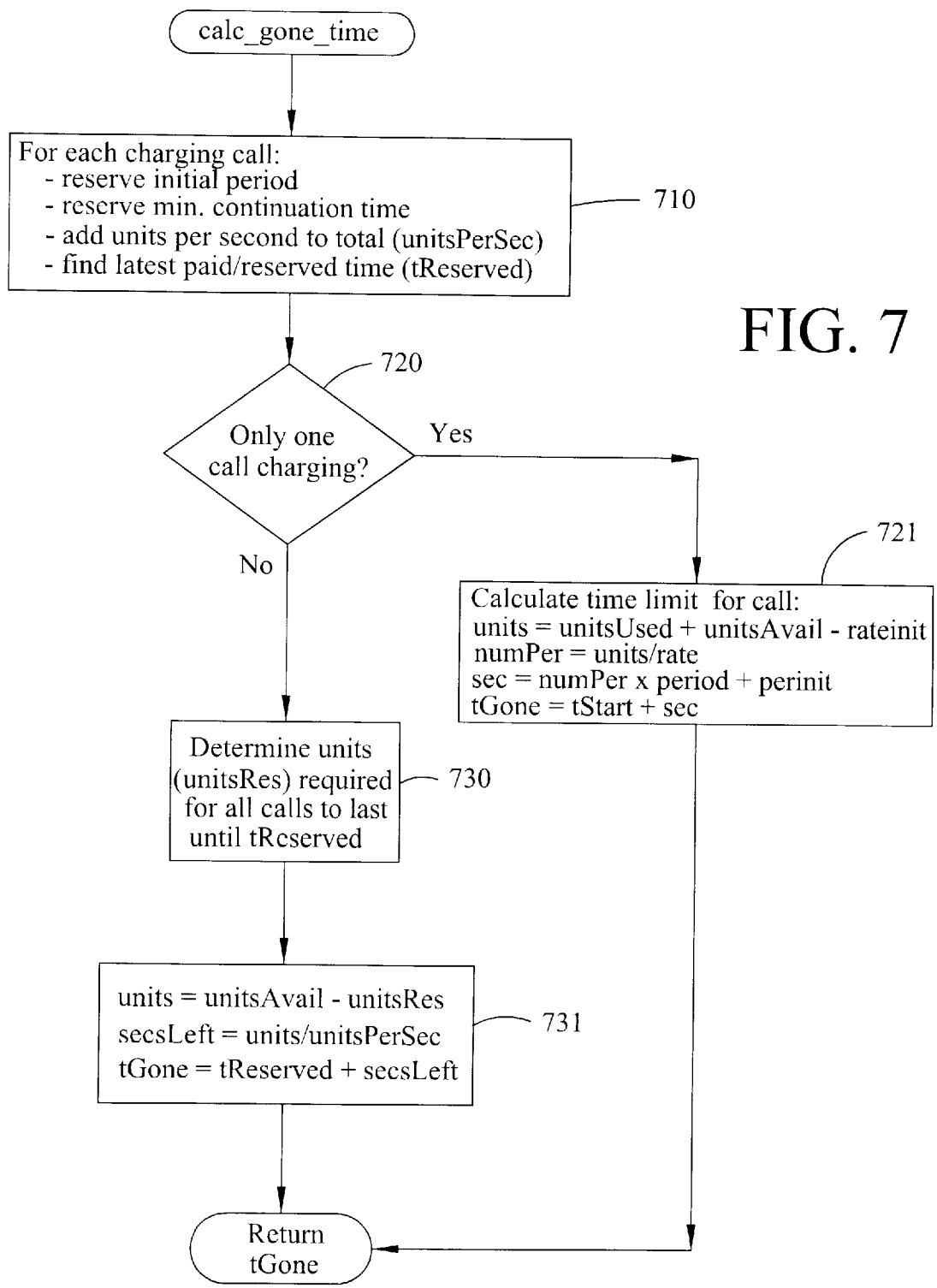
FIG. 7 is a flow chart diagram of a calc_gone_time program.

Referring next to FIG. 7, the calc_gone_time procedure estimates the time that the subscriber's available balance will run for all the calls in progress.

At step 710, the reserved time (tReserved) is set as the time reserved for this call to account for the minimum call length, initial billing period, and minimum continuation time. The units for this reserved time (unitsRes) are subtracted from the available balance (unitsAvail). The units per second used for all calls is totaled to estimate when the available balance runs out. The latest reserved time for all calls is determined so that all calls can be brought up to that time.

At step 720, the computation becomes trivial when only one call is charging. At step 721, when only one call is charging, the time available is (unitsAvail—unitsReserved) divided by the billing rate multiplied by the billing period. The time that the subscriber's balance runs out (tGone) is tReserved for the call plus the time available.

At step 730, for each call, the units required for the call to last up to the latest reserved time is calculated and added to the units reserved (unitsRes). At step 731, the time that the subscribers money runs out is estimated from the units available, units reserved and total units per second.

Having thus described a preferred embodiment of a unique real-time rating and debiting process, it will be understood that the disclosed process is exemplary and not necessarily limiting of the protection afforded hereby. For example, wherever a debit card is described, the present invention envisions is any credit-type accounting system. Thus, the present invention should be limited only by the following claims.

What is claimed is:

1. A method for setting time limits for a debit card subscriber's multiple telephone calls; the method comprising the following steps:
    a) calculating total charges for all subscriber calls per a given time period;
    b) accounting for time already paid for calls in progress for the subscriber's account;
    c) reserving a minimum continuation time for any calls in progress;
    d) reserving time for all calls up to the most recently paid time;
    e) reserving a minimum call time for either of new and unanswered calls;
    f) dividing the remaining balance by the total charges per second;
    g) estimating the time the subscriber's balance reaches zero based upon the quotient resulting from the dividing steps; and
    h) setting a time limit for subscriber's calls based upon said estimating step.

2. The method recited in claim 1 further comprising the step of:
    i) accepting or rejecting a call based upon the time limit in said setting step.

3. The method recited in claim 1 further comprising the step of repeating steps a) to h) for each new call while continuing prior calls.

4. The method recited in claim 3 further comprising the step of:
    j) accepting or rejecting a new call based upon the latest time limit established in the most recent repetition of step h).

5. The method recited in claim 1 further comprising the step of rejecting a new call if the time limit set in step g) does not exceed the minimum time reserved in step e).

6. The method recited in claim 1 further comprising the step of resetting the time limits recited in steps a) to h) when an inbound call arrives.

7. The method recited in claim 1 further comprising the step of resetting the time limits recited in steps a) to h) when an outbound call is requested by the subscriber.

8. The method recited in claim 1 further comprising the step of resetting the time limits recited in steps a) to h) when an outbound call is seized.

9. The method recited in claim 1 further comprising the step of resetting the time limits recited in steps a) to h) when either of an inbound or an outbound call is answered.

10. The method recited in claim 1 further comprising the step of resetting the time limits recited in steps a) to h) when a first call is connected to another call.

11. The method recited in claim 1 further comprising the step of resetting the time limits recited in steps a) to h) when a first call is connected to a conference.

12. The method recited in claim 1 further comprising the step of resetting the time limits recited in steps a) to h) when a first call is connected to an internal call resource.

13. The method recited in claim 1 further comprising the step of resetting the time limits recited in steps a) to h) when a call service is invoked.

14. A system for setting time limits for a debit card subscriber's multiple telephone calls, comprising:

a) a means for calculating total charges for all subscriber calls per a given time period;

b) a means for accounting for time already paid for calls in progress for the subscriber's account;

c) a means for reserving a minimum continuation time for any calls in progress;

d) a means for reserving time for all calls up to the most recently paid time;

e) a means for reserving a minimum call time for either of new and unanswered calls;

f) a means for dividing the remaining balance by the total charges per second;

g) a means for estimating the time the subscriber's balance reaches zero based upon the quotient obtained from said means for dividing; and h) a means for setting a time limit for subscriber's calls based upon said estimated time.

15. The system of claim 14, further comprising a means for accepting or rejecting a call based upon the time limit received by said means for setting a time limit.

16. The system of claim 14, further comprising a means for accepting or rejecting a new call based upon the latest time limit established by said means for setting a time limit.

* * * * *